(12) United States Patent
Simkins, III

(10) Patent No.: US 11,745,947 B2
(45) Date of Patent: Sep. 5, 2023

(54) LEAF HAULING DEVICE

(71) Applicant: William Guerard Simkins, III, Apopka, FL (US)

(72) Inventor: William Guerard Simkins, III, Apopka, FL (US)

(73) Assignee: William Guerard Simkins, III, Spartenburg (SC)

( * ) Notice: Subject to any disclaimer, the term of this patent is extended or adjusted under 35 U.S.C. 154(b) by 0 days.

(21) Appl. No.: 17/152,316

(22) Filed: Jan. 19, 2021

(65) Prior Publication Data
US 2022/0227584 A1 Jul. 21, 2022

(51) Int. Cl.
*B65G 7/04* (2006.01)
(52) U.S. Cl.
CPC ..................... *B65G 7/04* (2013.01)
(58) Field of Classification Search
None
See application file for complete search history.

(56) References Cited

U.S. PATENT DOCUMENTS

| | | | | | |
|---|---|---|---|---|---|
| 3,355,187 | A | * | 11/1967 | Brindle | B65G 7/02 383/127 |
| 4,173,351 | A | * | 11/1979 | Hetland | B62B 15/007 280/18 |
| 4,405,673 | A | * | 9/1983 | Fridley | B65G 7/02 428/80 |
| 5,104,133 | A | * | 4/1992 | Reiner | A01G 20/40 383/127 |
| 5,660,402 | A | * | 8/1997 | Jones | B65F 1/1468 280/19 |
| 6,276,698 | B1 | * | 8/2001 | Calandra | B62B 15/00 280/18 |
| 6,565,101 | B2 | * | 5/2003 | Jones, Jr. | B62B 15/00 280/19 |
| 7,785,008 | B2 | * | 8/2010 | Schoenig | A45C 13/002 383/4 |
| 8,955,892 | B1 | * | 2/2015 | Shumate | B62B 15/007 294/1.3 |

* cited by examiner

*Primary Examiner* — Saul Rodriguez
*Assistant Examiner* — Ashley K Romano
(74) *Attorney, Agent, or Firm* — Edison Law Group

(57) ABSTRACT

This device is intended to provide a quick and easy way for one person to load and transport a relatively large number and weight of tree leaves without a great amount of strain or strength. It's size and configuration allows leaves to be collected on the specially designed tarp which is then hooked to the top of the device, and then easily rolled away with one hand.

9 Claims, 12 Drawing Sheets

Figure 1:
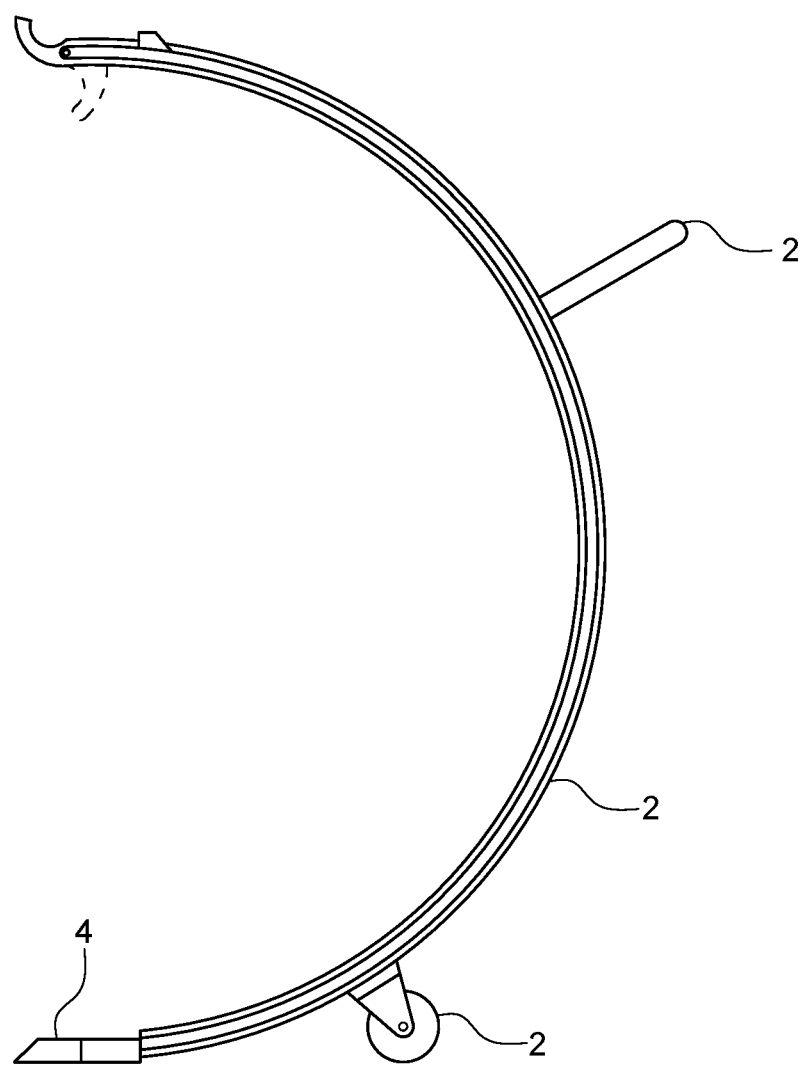

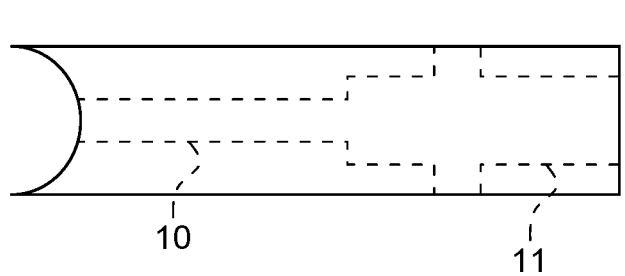
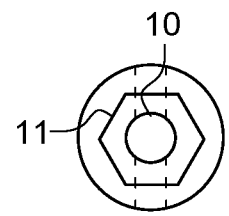
FIG. 18  FIG. 19
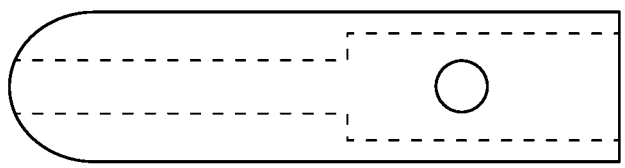
FIG. 20
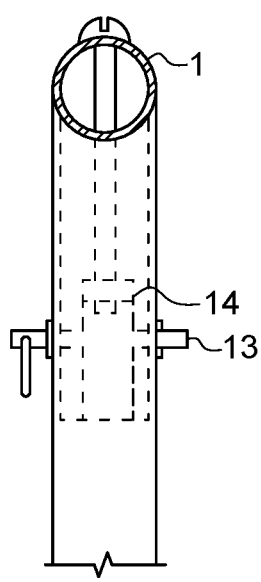
FIG. 21

LEAF HAULING DEVICE

FIELD OF THE INVENTION

Primarily, this is a lawn tool to aid those who live in yards or properties that have enough trees that every year they are faced with having to rake or blow a large amount of leaves to be collected and then moved to another location.

PRIOR ART

People for many years have had to rake tree leaves and then have used many ways to haul them another place. They have: loaded and then rolled wheelbarrows and carts which hold a limited volume of leaves; dragged or muscled tarps over their shoulders and hauled them by foot; or in the last few years used leaf blowers to move them (in increasing quantities of leaves as they go) from one place to another. These methods generally take an extended amount of time or an exerted effort of manpower, which often results in fatigue or even back and muscle injury. That has been my experience and motive for looking for a better way.

SUMMARY

The starting thought for the design is that the most practical approach for moving leaves in most situations is by collecting them in piles and putting them into or onto something that can then transport them to the street or some other location. Practically speaking, to put them into something requires either several trips with a very large cart or many trips with a smaller cart; or perhaps stuffing and hauling them in many fairly small bags. Either method is less than desirable. What most people do is to rake them onto a tarp and then have to either drag it or carry it over their shoulders. The primary goal then, seemed to be finding the easiest way to actually move a loaded tarp.

Looking for a Better way led to the Following Objectives That Were Included in the Design of This Device:

1. Provide a way for one person to move a large number of leaves at one time
2. Ensure that even a load of wet, heavy leaves can be transported
3. Ensure that it doesn't take a large amount of strength or effort to load and move
4. Make it quick and simple to use
5. Make it lightweight and durable
6. Make it easy to store away

DRAWINGS INCLUDED

Figure 2:
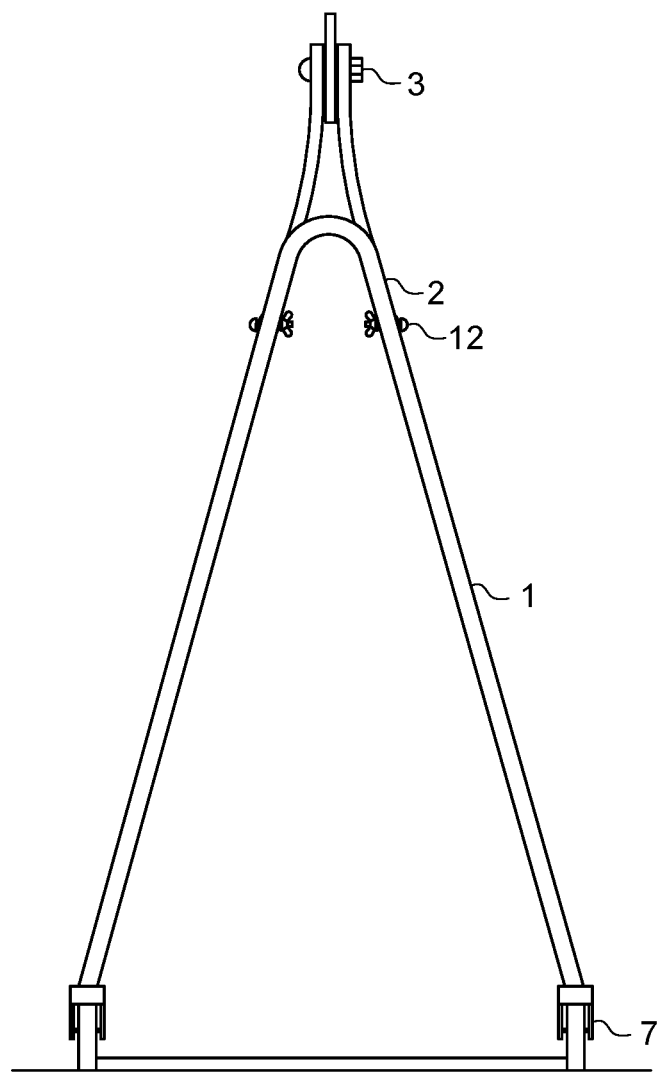
Figure 3:
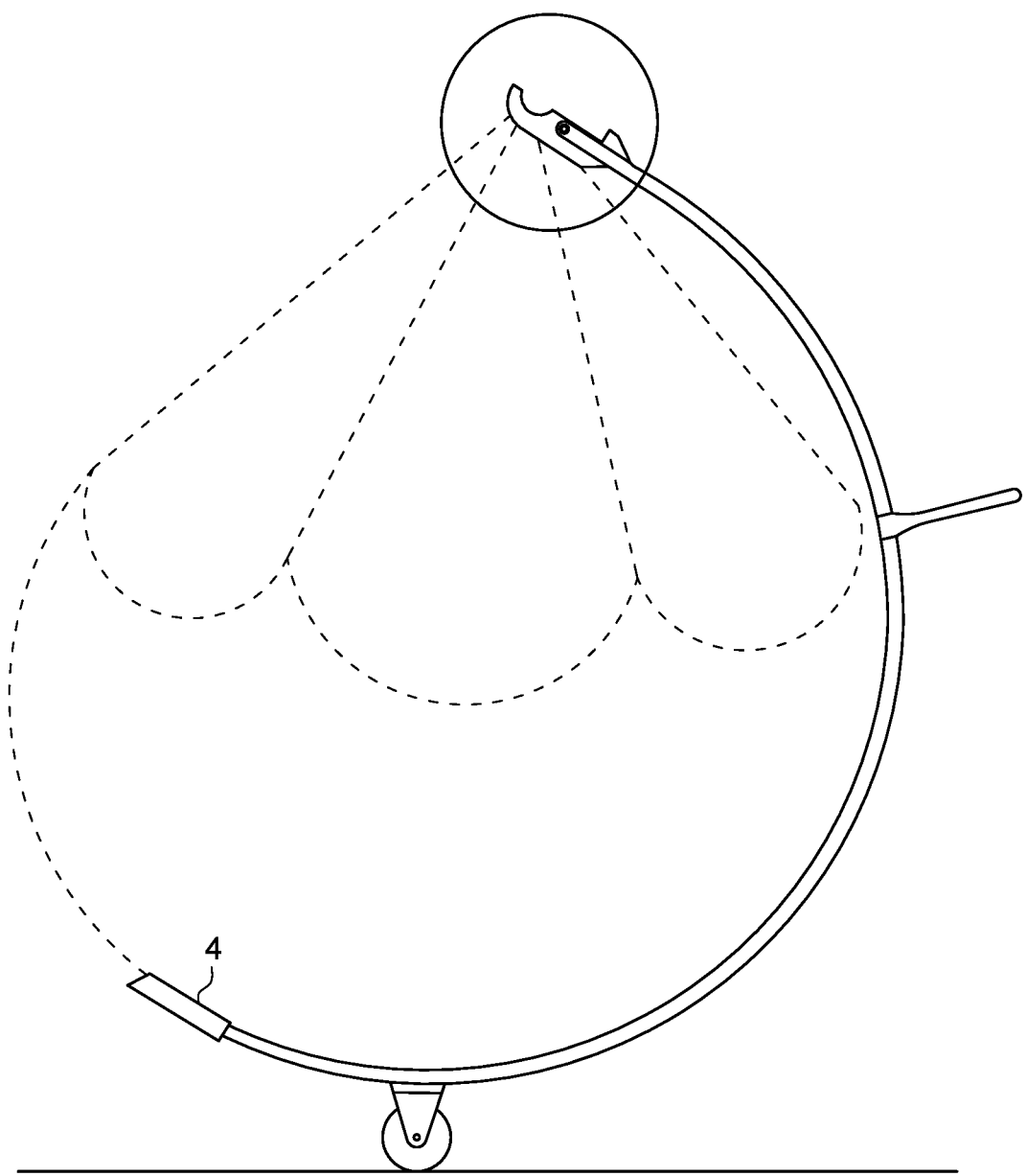
Figure 4:
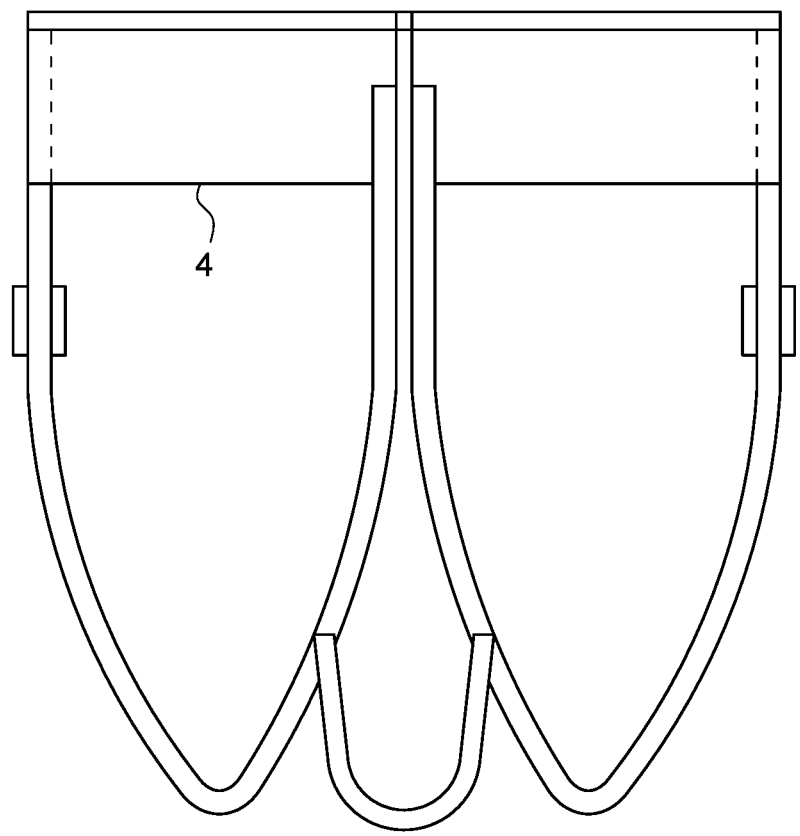
Figure 5:
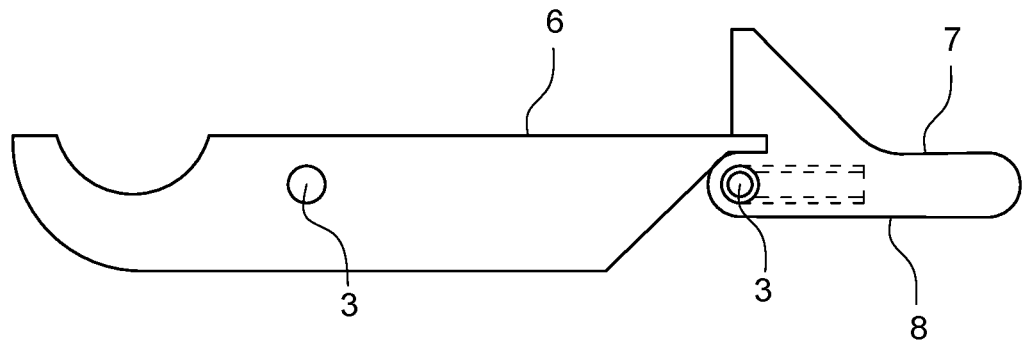
Figure 6:
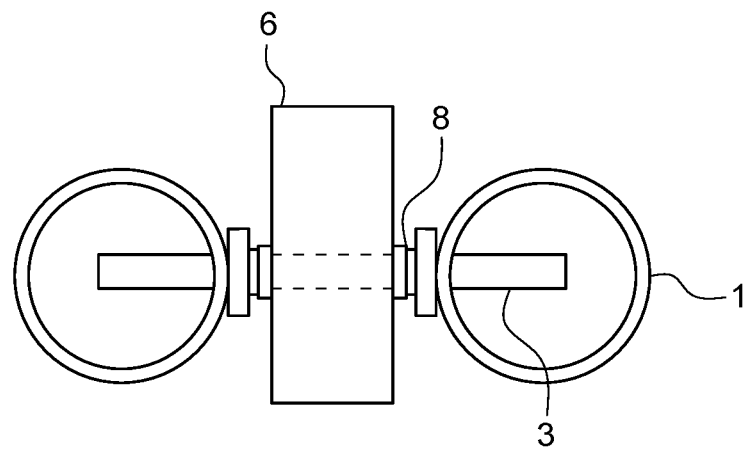
Figure 7:
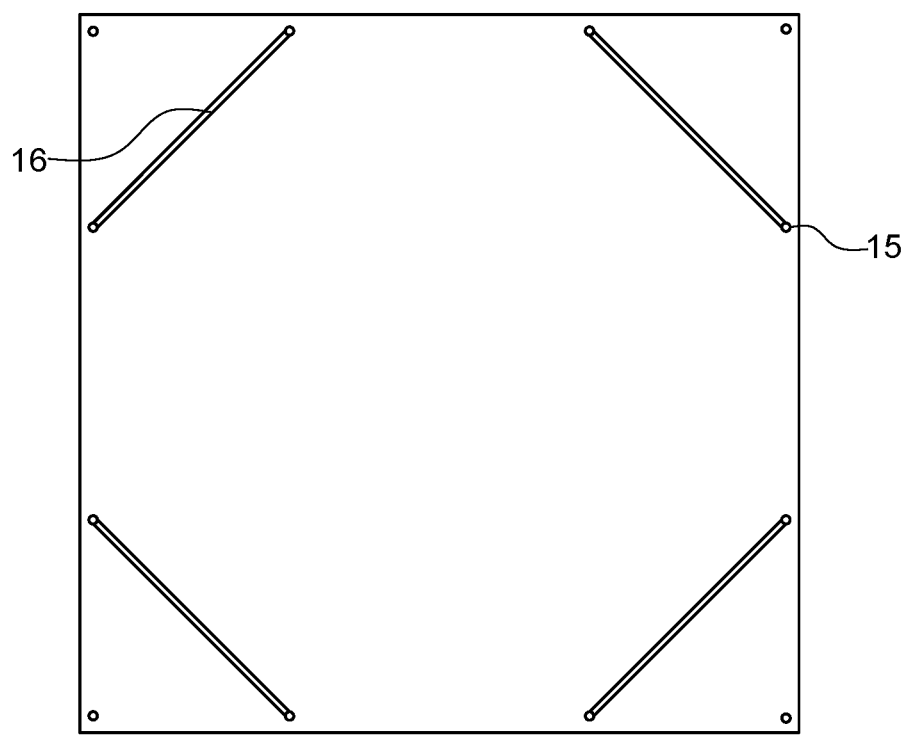
Figure 8:
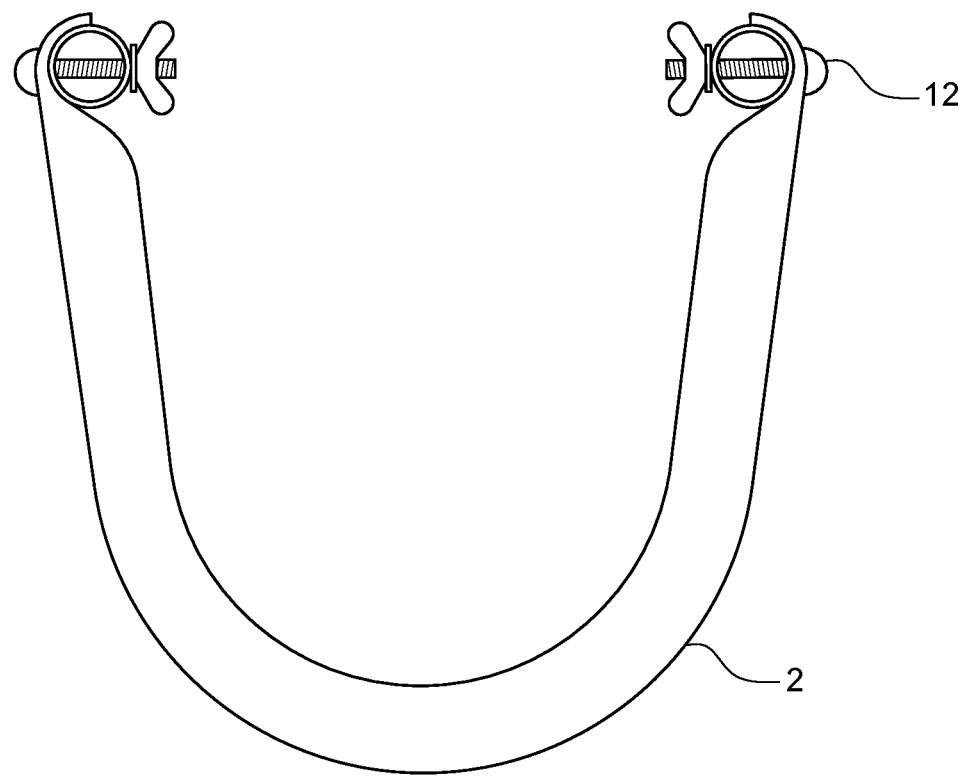
Figure 9:
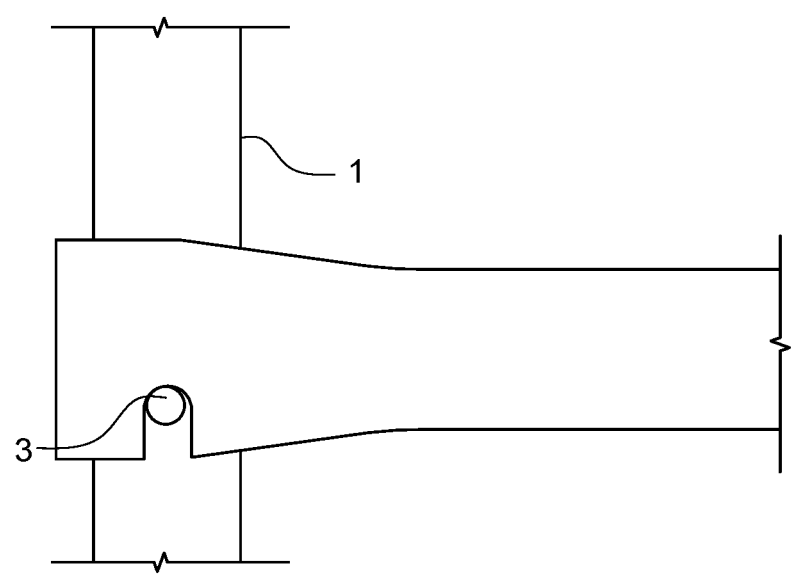
Figure 10:
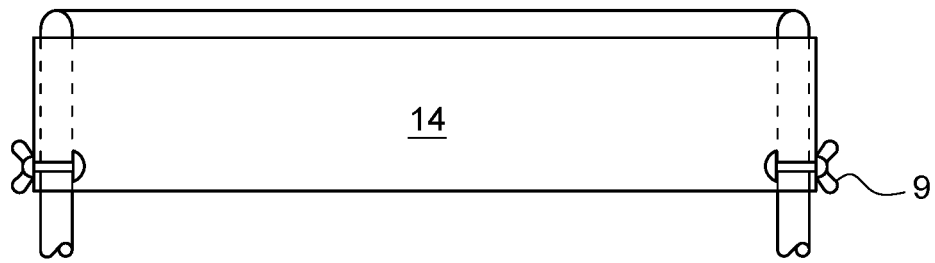
Figure 11:
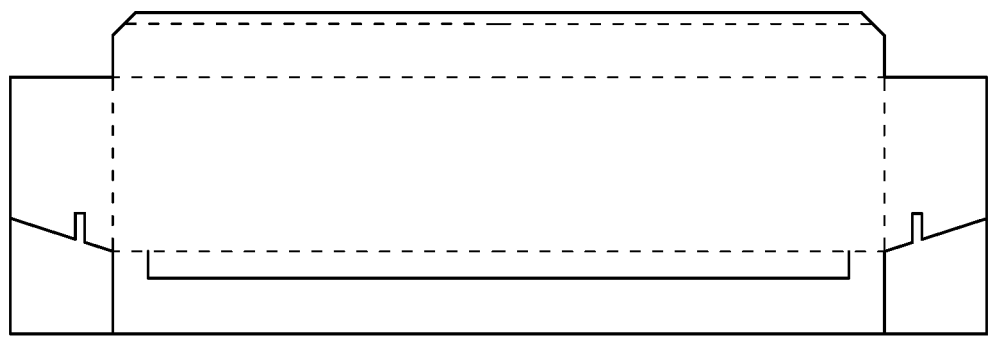
Figure 12:
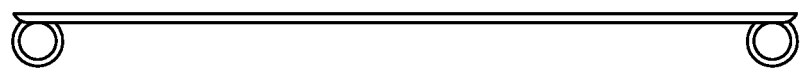
Figure 13:
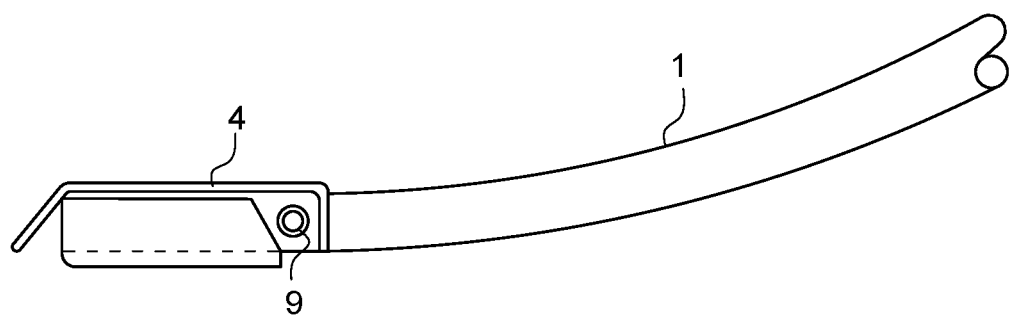
Figure 14:
Figure 15:
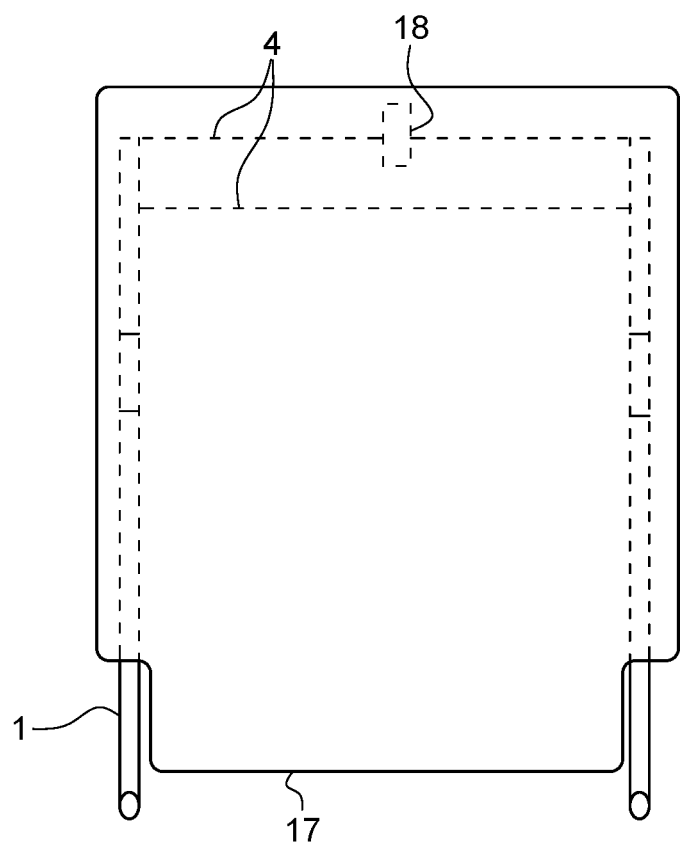
Figure 16:
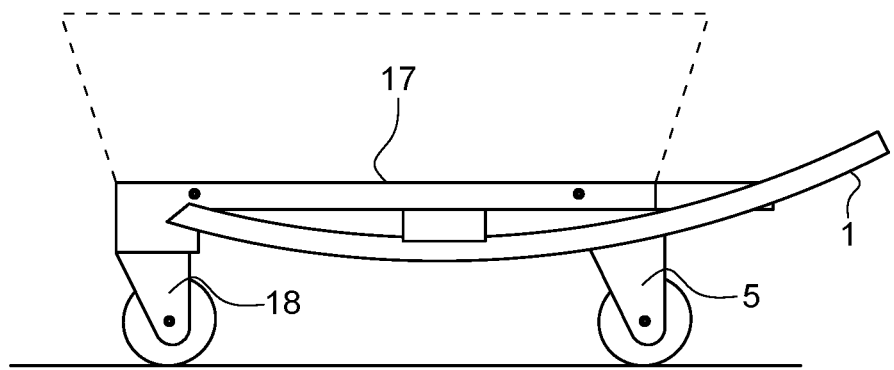
Figure 17:
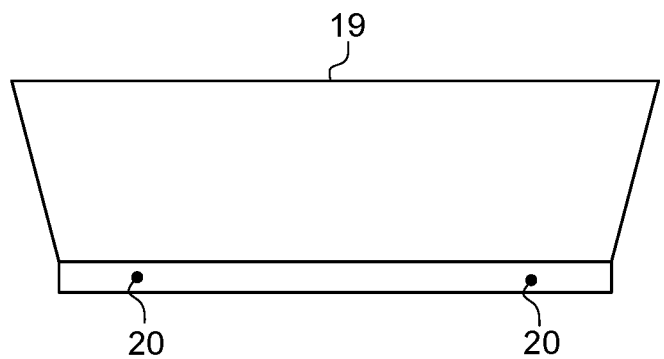

1/7 showing: FIG. 1—side elevation (at rest); FIG. 2—rear elevation; FIG. 3— side elevation (upright and loaded); FIG. 4—top view 2/7 showing: FIG. 5—large scale side view of the tarp retaining hook and tarp release lever; FIG. 6—cross section thru main frame tubes and tarp retaining hook at top of the device 3/7 showing: FIG. 7—a plan of the tarp showing grommet and lifting rope locations 4/7 showing: FIG. 8—a top view of the handle; FIG. 9—a side view of the handle where it attaches to the main frame tube 5/7 showing: FIG. 10—a top view of the toe plate; FIG. 11—a top view of the toe plate before bending; FIG. 12—a longitudinal section through the toe plate; FIG. 13— a cross section thru the toe plate; FIG. 14—a side view of the toe plate 6/7 showing: FIG. 15—a top view of the accessory "flatbed"; FIG. 16—side view of the accessory "flatbed"; FIG. 17—side view of the add-on sides to convert the flatbed into a containment cart 7/7 showing: an alternate concept for attaching the handle to the main frame tubes. FIG. 18—top view, FIG. 19—end view, and FIG. 20—side view, all of the molded plastic connector. FIG. 21—partial top view of the handle where it connects to the main frame tube and showing the connector in dotted lines inside the tube

Construction

The basic material of the device is aluminum, with some molded plastic parts, which is intended to make the construction generally non-corrosive and lightweight.

The two main tubular frames (1) are 25.4-millimeter (1-inch) diameter aluminum with heavy wall thickness for strength and bent in a curved shape for the correct dimensional geometry FIG. 1.

The tarp retaining hook (6) and tarp release lever (7) at the top, are shown in FIG. 5, and are made from molded plastic and are secured to the main frame tubes with 6.35-millimeter (¼-inch) bolts (3). A torsion spring (8) holds the release lever in position to be "latched" with the tarp retaining hook. FIG. 6 is a section thru the top showing the relationship between the main tubes (1), tarp retaining hook (6), torsion spring (8) and bolt (3).

Construction Cont'D

The handle (2) is also made from bent 25.4-millimeter (1-inch) aluminum tubing, FIG. 8, and is secured on each side by 6.35-millimeter (¼-inch) carriage bolts with wing nuts (12) for quick release. FIG. 9 is a partial side view of the connection of the handle to the main frame tube showing a slot that allows the handle to be removed when the wing nut is loosened. An alternate connection of the handle to the frame is shown in partial plan view in FIG. 21 in which molded plastic connectors are bolted to the main frame tubes with 6.35-millimeter (¼-inch) bolts and the handle is then slipped over the connector and fastened with quick release pins (13). FIGS. 18, 19 and 20 show the plastic connector in top view, end view and side view respectively and show the 6.35-millimeter (¼-inch) hole (10) for the connecting bolt and the hex hole (11) that secures the hex nut (14) for the bolt.

The 152.4-millimeter (6-inch) by 609.6-millimeter (24-inch) wide toe plate (4) is made from 2.38-millimeter (³⁄₃₂-inch) sheet aluminum and is rolled at the ends to form fit around the lower front end of the two 25.4-millimeter (1-inch) main frame tubes, see top view FIG. 10, fitting just loosely enough to be able to slide off of the tubes for storage. Bolts with wing nuts (9) secure the toe plate to the tubes. The toe plate in its cut-to-shape form before bending is shown in FIG. 11, and FIG. 12 is a longitudinal section thru the toe plate. FIG. 13 is a cross section thru the toe plate and FIG. 14 is a side/end view of the toe plate showing the slot that allows the toe plate to be easily removed when the wing nut is loosened.

In combination, the toe plate, the handle, and the bolted hook and tarp release mechanism at the top, hold the device together at three points to make it a stable and rigid frame.

The wheels (5) are 101.6 millimeters (4 inches) in diameter and made from non-corrosive material. They are fastened to the main frame tubes with 6.35-millimeter (¼-inch) bolts.

The tarp, FIG. 7, is made of polyester or nylon material and will have critically located grommets (15) on all sides. Braided nylon or polyester lifting ropes (16) reach across each of the four corners and are passed down thru the grommets and tied underneath with stopper knots. Grommets are also located at the four corners so the tarp can be independently used for other tasks.

There is an accessory molded plastic "flatbed" (17), top view FIG. 15, measuring approximately 635 millimeters (25 inches) wide by 762 millimeters (30 inches) deep that can be placed and cradled on the lower portion of the main tubes, side view FIG. 16, that allows loading and moving objects or materials weighing up to 45.4 kilograms (100 pounds). This weight has not been fully tested so it is possible the usable weight could be higher. The flatbed has a castor wheel (18) that gives a third point of support for the unit, making a level, stable surface easily turned and moved. A second part of the accessory is a molded plastic piece (19) that can attach to the "flatbed" with quick release pins (20), to form a cart with Construction Cont'D angled sides 203.2 millimeters (8 inches) high, FIG. 17, that provide means for carrying materials that are necessarily, or conveniently, contained making it ideal garden or any general use.

How it Works

Leaves are raked or blown onto the large 2.44 meter (8 foot) and 152.4 millimeter (6 inch) by 2.44 meter (8 foot) and 152.4 millimeter (6 inch) tarp, which is sized to hold a much larger volume of leaves than one person could reasonably carry. The device is then rolled to any edge of the loaded leaf tarp and placed in the rest position, FIG. 1. The tarp retaining hook at the top is rotated to lock into the tarp release lever as shown on FIG. 5. The ropes on all four corners are then lifted, perhaps only one or two at a time (which reduces the weight having to be lifted at one time) and looped over the hook. When all four ropes have been looped, the top of the device is pulled/rotated backwards to an upright position and with a concurrent backward tug on the tarp, and the load is thusly shifted and balanced over the wheels, FIG. 3, and is cradled and additionally supported on the two tubular frames and the toe plate (4). The handle (2) is located at a comfortable height for a person to hold, allowing a large, and even very heavy load, to be easily rolled away with one hand to be dumped elsewhere. When at the dump location, the tarp release lever (7) is pushed downward letting the tarp retaining hook (6) holding the ropes (16) to pivot, thus releasing the lifting ropes and tarp, which falls to the ground so the leaves can be deposited. To reset the tarp release lever, the end of the lever (opposite the hook end) is simply pushed downward, locking it in place to the release lever making it ready to reload. For easy storage, the device is designed to be collapsed by slightly loosening the bolt wing nut (3) at the top, the bolt wing nuts (12) for removing the handle, and the bolt wing nuts (9) for removing the toe plate. The two main tubes will then naturally rotate together, considerably reducing the width of the unit. The collapsed dimensions are approximately 1.22 meters (4 feet) and 152.4 millimeters (6 inches) long, 0.61 meters (2 feet) and 101.6 millimeters (4 inches) wide, and 127 millimeters (5 inches) deep, and with a weight of 4.54 kilograms (10 pounds)+/−, it can conveniently be hung on a wall or otherwise stored.

The invention claimed is:

1. A leaf-hauling device comprising:
   a spaced-apart pair of tubular frames, wherein the tubular frames are semicircular when the leaf hauling device is viewed from a side, wherein each one of the pair of tubular frames has an upper end portion and a lower end portion, and wherein one of the pair of tubular frames is located aside the other one of the pair of tubular frames when the leaf hauling device is viewed from above;
   a toe plate removably secured to the lower end portion of each one of the pair of tubular frames; and
   a hook mechanism pivotally mounted to the upper end portion of each one of the pair of tubular frames, from which a tarp can be hung.

2. The leaf-hauling device of claim 1, wherein the spaced apart pair of tubular frames are made of aluminum.

3. The leaf-hauling device of claim 1, wherein the toe plate is made of aluminum.

4. The leaf-hauling device of claim 1, wherein the hook mechanism is made of molded plastic.

5. The leaf-hauling device of claim 1, wherein the tarp is made of polyester or nylon, has four sides, and includes at least two grommets on each one of the four sides, wherein the grommets are sized to receive a lifting rope passed therethrough for hanging the tarp from the hook mechanism.

6. The leaf-hauling device of claim 1, including: a spaced-apart pair of wheels, wherein each one of the pair of wheels is fixed to an associated one of the pair of tubular frames located adjacent to the toe plate; and a handle removably secured to each of the tubular frames between the upper end portion of the pair of tubular frames and the spaced-apart pair of wheels.

7. The leaf-hauling device of claim 6, wherein the handle is made of aluminum.

8. The leaf-hauling device of claim 6, including: a flatbed cradled upon the lower end portion of each of the tubular frames, wherein the flatbed includes a castor wheel spaced from each of the pair of tubular wheels.

9. The leaf-hauling device of claim 8, wherein the flatbed is made of molded plastic.

* * * * *